(12) United States Patent
Fujita (10) Patent No.: US 7,794,218 B2
(45) Date of Patent: Sep. 14, 2010

(54) ROOTS TYPE PUMP AND FUEL CELL SYSTEM

(75) Inventor: Nobuo Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 327 days.

(21) Appl. No.: 12/083,769

(22) PCT Filed: Nov. 16, 2006

(86) PCT No.: PCT/JP2006/322865

§ 371 (c)(1),
(2), (4) Date: Apr. 18, 2008

(87) PCT Pub. No.: WO2007/066486

PCT Pub. Date: Jun. 14, 2007

(65) Prior Publication Data

US 2009/0047163 A1 Feb. 19, 2009

(30) Foreign Application Priority Data

Dec. 7, 2005 (JP) .............................. 2005-353150

(51) Int. Cl.
*F03C 2/00* (2006.01)
*F03C 4/00* (2006.01)
*F04C 18/00* (2006.01)

(52) U.S. Cl. .............. 418/206.5; 418/201.3; 418/206.1; 417/410.1; 417/410.4; 417/420

(58) Field of Classification Search .............. 418/206.1, 418/206.5, 201.1, 201.3; 417/410.1, 410.4, 417/420; 310/103–105, 112
See application file for complete search history.

(56) References Cited

U.S. PATENT DOCUMENTS

| 5,040,959 | A | * | 8/1991 | Fukagawa | ................. | 418/206.5 |
| 5,152,684 | A | * | 10/1992 | Steffens | ................... | 418/206.5 |
| 5,348,448 | A | * | 9/1994 | Ikemoto et al. | ............... | 417/17 |
| 6,164,945 | A | * | 12/2000 | Ishibashi et al. | ......... | 418/206.5 |
| 6,206,668 | B1 | * | 3/2001 | Teraoka et al. | ........... | 418/206.1 |
| 2005/0110446 | A1 | | 5/2005 | Kagami et al. | | |

FOREIGN PATENT DOCUMENTS

| JP | 62-200188 | | 12/1987 |
| JP | 04058093 A | * | 2/1992 |
| JP | 05-263769 A | | 10/1993 |
| JP | 2005-155409 A | | 6/2005 |
| JP | 2005-180421 A | | 7/2005 |

* cited by examiner

*Primary Examiner*—Theresa Trieu
(74) *Attorney, Agent, or Firm*—Kenyon & Kenyon LLP (57) ABSTRACT

There is disclosed a Roots type pump in which two rotors are rotated synchronously in a pump chamber to compress fluid therein, wherein respective stop positions of the rotors in the pump chamber at a time of stopping the pump are determined independently of each other.

8 Claims, 4 Drawing Sheets

ROOTS TYPE PUMP AND FUEL CELL SYSTEM

This is a 371 national phase application of PCT/JP2006/322865 filed 16 Nov. 2006, claiming priority to Japanese Patent Application No. 2005-353150 filed 7 Dec. 2005, the contents of which are incorporated herein by reference.

TECHNICAL FIELD

This invention relates to a Roots type pump, and a fuel cell system using a Roots type pump or the like.

BACKGROUND ART

A fuel cell system is a system in which a fuel gas and an oxidizing agent gas are supplied to a fuel cell via corresponding gas feed passages, and electricity is generated by using an electrochemical reaction of these gases in a fuel cell body.

Water is generated in the fuel cell body by the electrochemical reaction, and this water is discharged from the fuel cell body in a condition that the water is contained in a fuel-off gas (a fuel gas discharged from the fuel cell body) and an oxidizing-agent-off gas (an oxidizing agent gas discharged from the fuel cell body).

Therefore, if the ambient temperature of the system falls to the freezing point or below in a stop state of the fuel cell system, the moisture in the gases remaining in the valves, the piping, etc., arranged in the gas passages of the system, may condense and the component parts of the system may be frozen. In such a case, there is a possibility that starting the fuel cell system is impossible even if an operation to start the fuel cell system is performed thereafter. Or, there is a possibility that, even if the fuel cell system can be started, it is difficult to perform the normal operation of the fuel cell system. In particular, the freezing of a gas supplying device, such as a pump, would make the supplying of fuel gas or oxidizing agent gas impossible, and considerable time would be needed to put the entire system into operation.

In a case in which a Roots type pump is used as a fuel feed pump of a fuel cell system, if the freezing of the pump arises in a condition that the moisture is contained between a clearance between the rotor and the opposing casing inside surface, the problem occurs that the rotor adheres to the casing and it is impossible to start operation of the pump promptly at a time of restarting the pump.

To avoid the problem, there has been proposed a Roots type pump in which a funnel-like accumulation part to accumulate the moisture is provided on the bottom of the casing and the water within the pump is discharged via the accumulation part. This pump is aimed at reducing the amount of residual water in the pump and preventing freezing of the condensed water in the pump at a time of stopping the pump. See Japanese Laid-Open Patent Application No. 2005-180421.

Moreover, there has been proposed a Roots type pump in which the forward/reverse rotation of the rotor is repeated, prior to a restart of the pump in low temperature environment, to separate or remove the frozen water between the rotor and the opposing casing inside surface, so that the pump is restarted thereafter. See Japanese Laid-Open Patent Application No. 2005-155409.

Patent document 1: Japanese Laid-Open Patent Application No. 2005-180421

Patent document 2: Japanese Laid-Open Patent Application No. 2005-155409

DISCLOSURE OF THE INVENTION

The Problem to be Solved by the Invention

Generally, in the existing Roots type pump, at a time of stopping the pump, the two rotors are stopped in the pump chamber with the positional relationship immediately after they are synchronously rotated during operation of the pump being retained. Therefore, when the pump disclosed in Japanese Laid-Open Patent Application No. 2005-180421 is used, there is a possibility that, for a certain stop position of the rotors, freezing of the condensed water in the pump chamber arise during a pump stop and the rotor adhere to the casing. For example, if one rotor is stopped with a set of blades of the rotor being in a substantially horizontal position to the installation surface on which the pump is installed (refer to the positional relationship between a second rotor 60 and a pump casing 15 in FIG. 2), the moisture condensed on the top surface of the rotor is left in the clearance between the rotor and the opposing casing inside surface by surface tension. Since the residual water is not guided to the accumulation part on the casing bottom, the rotor will adhere to the casing when freezing of the moisture in this position arises.

According to one aspect of the invention, there is disclosed an improved Roots type pump in which the above-mentioned problem is eliminated.

According to one aspect of the invention, there is disclosed a Roots type pump which prevents the freezing of the pump and the adhering of the rotors to the casing even if the pump is stopped with moisture-containing gases remaining in the pump chamber.

According to one aspect of the invention, there is disclosed a fuel cell system using a Roots type pump which prevents the freezing of the pump and the adhering of the rotors to the casing even if the pump is stopped with moisture-containing gases remaining in the pump chamber.

Means for Solving the Problem

In an embodiment of the invention which solves or reduces one or more of the above-mentioned problems, there is disclosed a Roots type pump in which two rotors are rotated synchronously in a pump chamber to compress fluid therein, wherein respective stop positions of the rotors in the pump chamber at a time of stopping the pump are determined independently of each rotor. In the Roots type pump of this embodiment, the respective stop positions of the rotors are determined independently of each other, and it is possible that the rotors are stopped at positions where they do not easily adhere to the opposing casing inner surface.

In an embodiment of the invention which solves or reduces one or more of the above-mentioned problems, there is disclosed a Roots type pump in which a first rotor fixed to a first revolving shaft and a second rotor fixed to a second revolving shaft are rotated synchronously in a pump chamber to compress fluid therein, the Roots type pump comprising a switching mechanism wherein, at a time of pump operation, rotation of the first rotor by the first revolving shaft and rotation of the second rotor by the second revolving shaft is set in a synchronous condition, and at a time of stopping the pump, rotation of the first rotor by the first revolving shaft and rotation of the second rotor by the second revolving shaft is set in an asynchronous condition. This embodiment makes it possible to control certainly the stop positions of the rotors at a time of stopping the pump.

The above-mentioned Roots type pump may be arranged so that, in the asynchronous condition, the first rotor fixed to the first revolving shaft and the second rotor fixed to the second revolving shaft are at rotation positions which are independent of each other.

In an embodiment of the invention which solves or reduces one or more of the above-mentioned problems, there is disclosed a Roots type pump in which a first rotor fixed to a first revolving shaft and a second rotor fixed to a second revolving shaft are rotated synchronously in a pump chamber to compress fluid therein, the Roots type pump comprising: a first gear attached to an end of the first revolving shaft which rotates the first rotor; and a second gear attached to an end of the second revolving shaft which rotates the second rotor, wherein, at a time of starting the pump, the first gear and the second gear are engaged with each other, and rotation of the first revolving shaft by an external drive source enables the second revolving shaft to be rotated via the engaged first and second gears so that the first and second rotors are rotated synchronously, and wherein, at a time of stopping the pump, the first gear and the second gear are disengaged and the first rotor and the second rotor are stopped at predetermined stop positions respectively.

The above-mentioned Roots type pump may be arranged so that engagement and disengagement of the first gear and the second gear are performed by using an electromagnetic coupling, and the first and second rotors are stopped at the predetermined stop positions by using permanent magnets arranged outside the pump chamber.

The above-mentioned Roots type pump may be arranged so that the first and second rotors are provided in two-blade formation, and the first and second rotors are stopped at respective stop-positions other than where a direction of a straight line passing through a leading edge of one of two blade parts of each rotor and a leading edge of the other of the two blade parts is at right angles to a vertical direction. In this embodiment, the moisture condensed from the fuel-off gas or the oxidizing-agent-off gas contained in the pump chamber under low temperature environment falls by gravity and the condensed water does not remain on the rotor surfaces, and it is possible to prevent the adhesion of the rotors in the pump chamber in low temperature environment.

The above-mentioned Roots type pump may be arranged so that the first and second rotors are stopped at the respective stop positions where a direction of a straight line passing through a leading edge of one of two blade parts of each rotor and a leading edge of the other of the two blade parts is in parallel to the vertical direction.

The above-mentioned Roots type pump may be arranged so that a discharge port for discharging compressed fluid is arranged at a bottom portion of the pump chamber, wherein the first and second rotors are stopped at the respective stop positions where a straight line passing through a leading edge of one of two blade parts of the first rotor and a leading edge of the other of the two blade parts and a straight line passing through a leading edge of one of two blade parts of the second rotor and a leading edge of the other of the two blade parts of the second rotor are at inclination angles to the vertical direction respectively, and wherein the inclination angles are determined such that positions on outer circumferences of lower blade parts of the first and second rotors where a horizontal distance from a vertical line passing through a center of rotation of each rotor, to a center of the pump chamber is the maximum are determined as points R and S, respectively, and a straight line extending from the point R and a straight line extending from the point S both in parallel to the vertical direction pass through the discharge port. In this embodiment, the moisture condensed from the off gases contained in the pump chamber under low temperature environment falls by gravity and the resulting water is discharged from the discharge port, and it is possible to prevent the freezing of the rotors within the pump chamber more certainly.

The above-mentioned Roots type pump may be arranged so that the first and second rotors are not in contact with each other at a time of stopping the pump.

The above-mentioned Roots type pump is applicable to a fuel cell system. In this fuel cell system, it is possible to start operation of the system promptly even if the system is placed in low temperature environment.

EFFECTS OF THE INVENTION

According to the embodiments of the Roots type pump of the invention, it is possible to prevent the adhering of the rotors to the casing inside surface in the pump chamber even if the pump is placed in low temperature environment. According to the embodiments of the fuel cell system using the Roots type pump of the invention, it is possible to start operation of the system promptly even if the system is placed in low temperature environment.

DESCRIPTION OF REFERENCE NUMERALS 1 fuel cell body
2 fuel-gas passage
3 oxidizing-agent-gas passage
10 pump
15 pump casing
20 pump chamber
25 suction port
30 discharge port
35 first revolving shaft
40 second revolving shaft
45 motor section
48 pump section
50 first rotor
50a, 50b blade parts of first rotor
60 second rotor
60a, 60b blade parts of second rotor
70 first timing gear
72 second timing Gear
74 electromagnetic coupling
80 switching mechanism
129 electric motor
200 high-pressure hydrogen tank
201 fuel-gas feed passage
203 circulation passage
207 first branch passage
209 second branch passage
210 hydrogen pump
220 gas/liquid separator for fuel off-gas
230, 234, 240, 244, 246 solenoid valves 232 pressure reduction control valve
242 non-return valve
250 dilution device
301 oxidizing-agent-gas feed passage
303 oxidizing-agent-off gas discharge passage
305 compressor
309, 344, 510 solenoid valves
325 humidifier

BEST MODE FOR CARRYING OUT THE INVENTION

A description will now be given of the embodiments of the invention with reference to the accompanying drawings.

Figure 1:
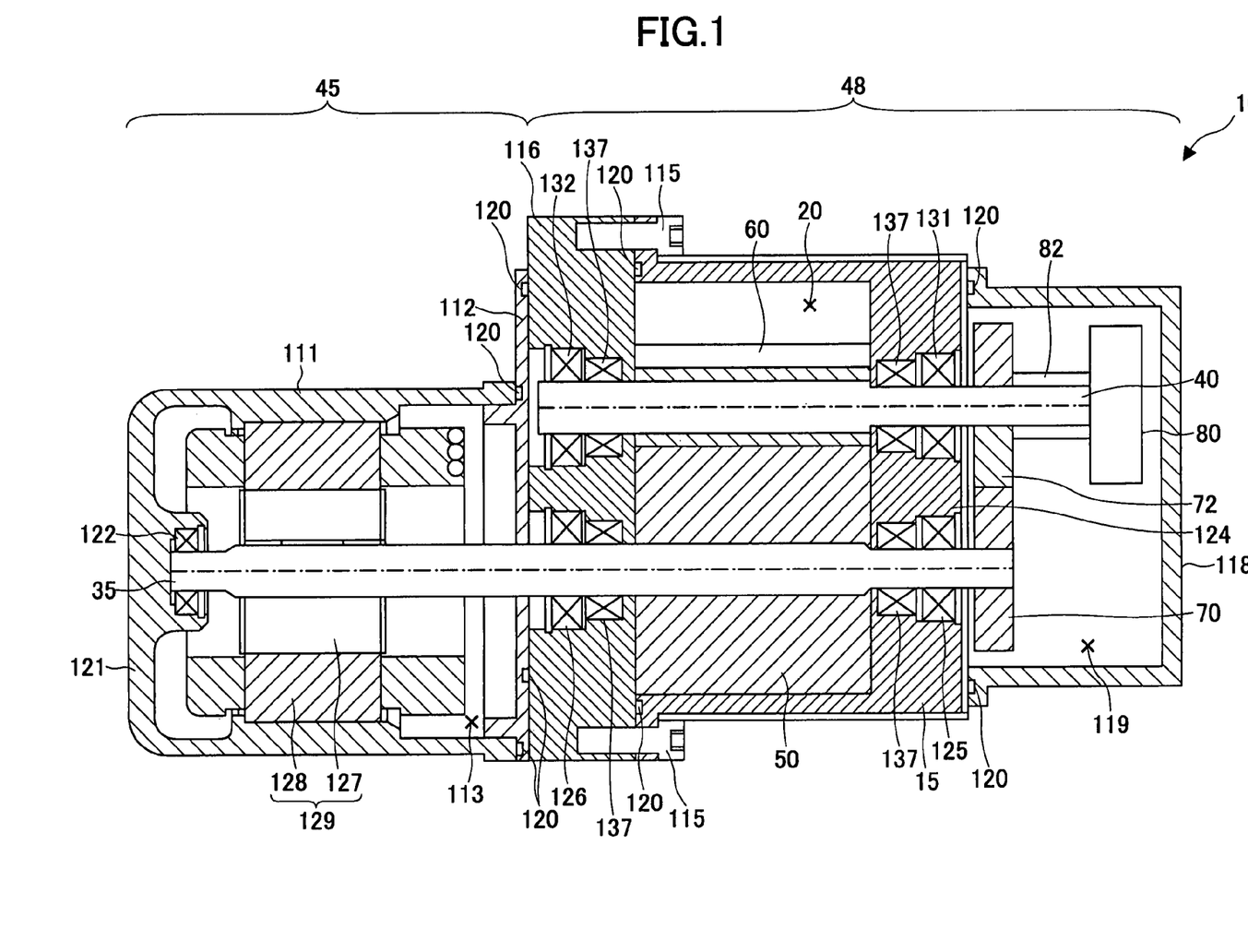
FIG. 1 is a cross-sectional diagram showing the composition of a pump in an embodiment of the invention.

FIG. 1 shows the composition of a Roots type pump 10 in an embodiment of the invention. The Roots type pump 10 includes a motor section 45 and a pump section 48.

The motor section 45 includes a generally cylindrical motor housing 111 with one end closed (at the left-side end of the element 111 in FIG. 1) closed and the other end opened (at the right-side end of the element 111 in FIG. 1). The motor section 45 includes a partition 112 which is secured so as to block the opening of the motor housing 111. And the inside surface of the motor housing 111 and the inside surface of the partition 112 are formed to surround a motor chamber 113.

The pump section 48 includes a generally elliptic cylindrical pump casing 15 with one end opened (at the left-side end of the element 15 in FIG. 1) and the other end closed. The pump section 48 includes a bearing block 116 which is secured by bolts 115 so as to block the opening of the pump casing 15. And the inside surface of the pump casing 15 and the inside surface of the bearing block 116 are formed to surround a pump chamber 20.

In the pump section 48, a generally elliptic cylindrical housing 118 which is smaller in size than the pump casing 15 is secured to the other end of the pump casing 15 (at the right-side end of the element 15 in FIG. 1) by bonding. And the outside surface of the pump casing 15 at the other end and the inside surface of the gear housing 118 are formed to surround a gear chamber 119.

The motor section 45 and the pump section 48 are integrally formed through joining of the outside surface of the partition 112 and the outside surface of the bearing block 116 by fasteners (not shown), such as bolts. For the purpose of airtight reservation, an O ring 120 is attached to each of the joining areas between the joining surfaces of motor housing 111 and partition 112, the joining surfaces of pump casing 15 and bearing block 116, the joining surfaces of pump casing 15 and gear housing 118, and the joining surfaces of partition 112 and bearing block 116, respectively.

A bearing 122 is arranged at the end portion 121 of the motor housing 111 in the position which is located coaxially with the central axis of the motor housing 111 and faces the motor chamber 113. And one end of a drive shaft (first revolving shaft) 35 (at the left side end of the element 35 in FIG. 1) is rotatably supported by this bearing 122.

The other end of the first revolving shaft 35 penetrates the partition 112, the bearing block 116, and the end portion 124 of the pump casing 15, and is arranged to reach the gear chamber 119. A bearing 125 is arranged at the end portion 124 of the pump casing 15, and a bearing 126 is arranged in the bearing block 116. The other end of the first revolving shaft 35 is rotatably supported by the bearing 125, and the intermediate portion of the first revolving shaft 35 is rotatably supported by the bearing 126.

In the motor chamber 113, a motor rotor 127 is attached to the first revolving shaft 35, a motor stator 128 which is located outside the motor rotor 127 is attached to the motor housing 111. The motor rotor 127 and the motor stator 128 are arranged to constitute an electric motor 129.

In the pump chamber 20 of the pump section 48, a second revolving shaft 40 is arranged in parallel to the first revolving shaft 35, and the ends of the second revolving shaft 40 are rotatably supported by a bearing 131 arranged at the end portion 124 of the pump casing 15 and a bearing 132 arranged in the bearing block 116, respectively.

In the pump chamber 20, a drive rotor (first rotor) 50 and a follower rotor (second rotor) 60 which are provided in two-blade formation are attached to the first revolving shaft 35 and the second revolving shaft 40, respectively.

Similar to the other end of the first revolving shaft 35, the other end of the second revolving shaft 40 penetrates the end portion 124 of the pump casing 15, and is arranged to reach the gear chamber 119. A switching mechanism 80 (which will be mentioned below) is arranged at the other end of the second revolving shaft 40 within the gear chamber 119. A sealing 137 is attached to each of the sliding areas between the first revolving shaft 35 and the bearing block 116, between the second revolving shaft 40 and the bearing block 116, between the first revolving shaft 35 and the end portion 124 of the pump casing 15, and between the second revolving shaft 40 and the end portion 124 of the pump casing 15, respectively.

In the gear chamber 119, a first timing gear 70, a second timing gear 72, and a switching mechanism 80 are arranged. The first timing gear 70 is fixed to the other end of the first revolving shaft 35. On the other hand, the second timing gear 72 is installed in a vicinity of the other end of the second revolving shaft 40. A coupling rod 82 is connected to the second timing gear 72, and this coupling rod 82 constitutes a part of the switching mechanism 80.

The switching mechanism 80 is arranged to allow slide movement of the coupling rod 82 within the gear chamber 119 (in the left direction of FIG. 1) using an electrical or mechanical actuator, such as a motor. Thereby, the switching mechanism 80 allows the engagement condition of the second timing gear 72 with the first timing gear 70 to be changed to one of the engaged state and the non-engaged state. For example, during operation of the pump 10, the engagement condition of the second timing gear 72 with the first timing gear 70 is set to the engaged state as shown in FIG. 1. On the other hand, at a time of stopping the pump, the switching mechanism 80 moves the coupling rod 82 in the left direction of FIG. 1 in the gear chamber 119, thereby moving the second timing gear 72 in the left direction of FIG. 1 integrally with the coupling rod 82, so that the engaged state of the second timing gear 72 with the first timing gear 70 is canceled.

Next, a description will be given of the internal structure of the pump chamber 20 in the pump section 48.

Figure 2:
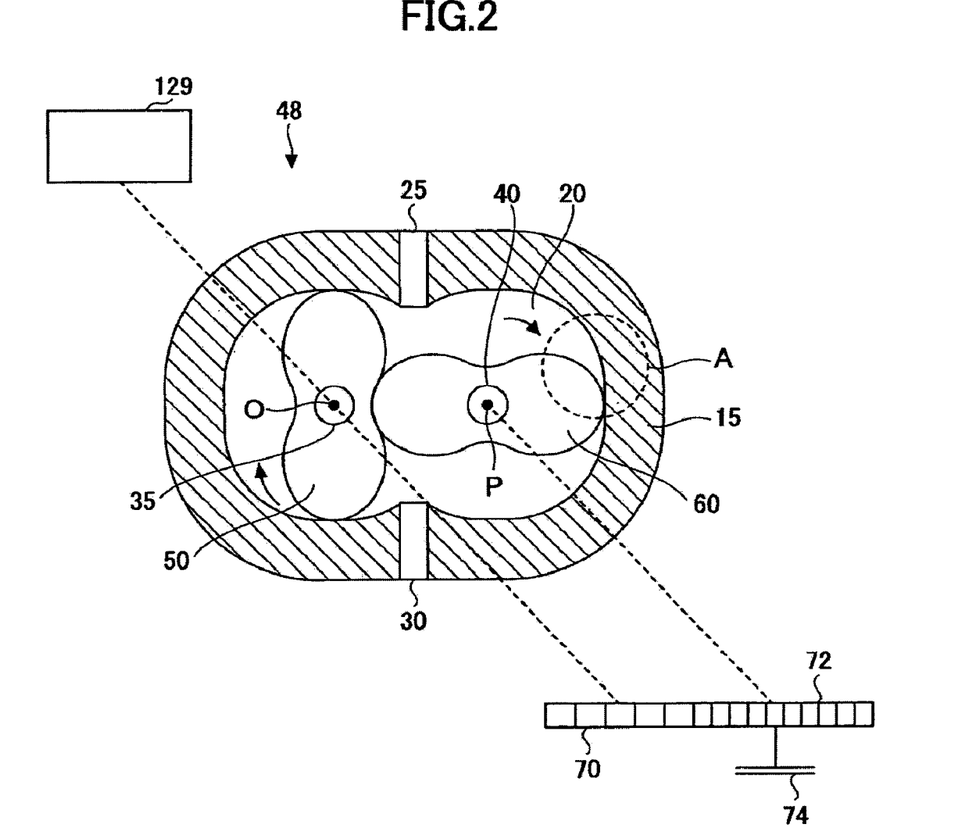
FIG. 2 is a diagram showing the condition of a pump chamber of the pump during operation of the pump.

FIG. 2 shows the condition of a pump chamber of the Roots type pump 10 of this embodiment during operation. In the Roots type pump 10 of this embodiment, the cross-section of the pump casing 15 is arranged in a generally elliptic formation, and the pump chamber 20 is formed in the inside of the pump casing 15.

The suction port 25 for attracting the fuel-off gas and the oxidizing-agent-off gas (which will be called the off gases) from a fuel cell body into the pump chamber 20 is formed in the pump casing 15. It is preferred to arrange the suction port 25 in the top-side surface of the pump casing 15 in the vertical direction.

The discharge port 30 for discharging the off gases, compressed in the pump chamber, from the pump chamber 20 is formed in the pump casing 15. It is preferred to arrange the discharge port 30 in the bottom-side surface of the pump casing 15 in the vertical direction.

In the pump chamber 20, the first rotor 50 and the second rotor 60 are arranged as mentioned above. The first rotor 50 is fixed to the first revolving shaft 35 passing through the center O, and the first revolving shaft 35 is rotated by the previously mentioned electric motor 129. The second rotor 60 is fixed to the second revolving shaft 40 passing through the center P, and the second revolving shaft 40 is arranged in parallel with the first revolving shaft 35 and extended outside the pump chamber 20.

As mentioned above, one end of the first revolving shaft 35 and one end of the second revolving shaft 40 are fixed to the first timing gear 75 and the second timing gear 72, respectively. During operation of the pump 10, the first and second timing gears 70 and 72 are engaged mutually.

As the first revolving shaft 35 is rotated by the electric motor 129, the first rotor 50 is rotated accordingly. Simultaneously, the second revolving shaft 40 is rotated through the first and second timing gears 70 and 72 in a rotating direction which is opposite to the rotating direction of the first revolving shaft 35. Therefore, in the pump chamber 20, the first rotor 50 and the second rotor 60 are rotated in the mutually opposite rotating directions as indicated by the arrows in FIG. 2.

The rotors 50 and 60 are rotated with a difference of 90 degrees in the rotational angle between the rotor 50 and the rotor 60 being retained. And the off gases which are attracted into the pump chamber 20 are compressed by the rotation of the rotors 50 and 60 in association with the inside surface of the pump chamber 20. A very small clearance between the inside surface of the pump chamber 20 and each of the rotors 50 and 60 is provided so that they are not in contact with each other, even when they approach in the nearest distance.

Suppose the case in which the above-described pump according to the invention is used a circulating pump of a fuel cell system. In this case, as depicted in the Background Art section of the Description, the off gases captured in the pump chamber 20 contain the moisture generated by the electro-chemical reaction in the fuel cell body, and a certain amount of residual water is introduced in the pump chamber 20 together with the off gases.

Therefore, if the pump 10 is stopped in the condition that the off gases are left in the pump chamber 20, the moisture in the off gases is condensed in the pump chamber 20, and there is a possibility that freezing arises in low temperature environment.

For example, when the pump is stopped with the stop positions of the rotors as shown in FIG. 2, it is likely that the condensed water is left in the portion indicated by the character A in FIG. 2 on the surface of the second rotor 60 by surface tension. Therefore, if the condensed water is frozen in this position, the second rotor 60 adheres to the inside surface of the pump casing 15 via the clearance. Such freezing would make the rotation of the second rotor 60 impossible, and it would make the restarting of the pump impossible until the problem of the freezing is resolved. Therefore, considerable time would be needed to allow the restarting of the pump.

An embodiment of the pump 10 of the invention is arranged to eliminate the above problem as follows. At a time of stopping the pump 10, the rotors 50 and 60 are stopped at predetermined positions in the pump chamber 20 which are hardly influenced by the freezing of the condensed water, without being restricted to the positional relationship thereof.

Figure 3:
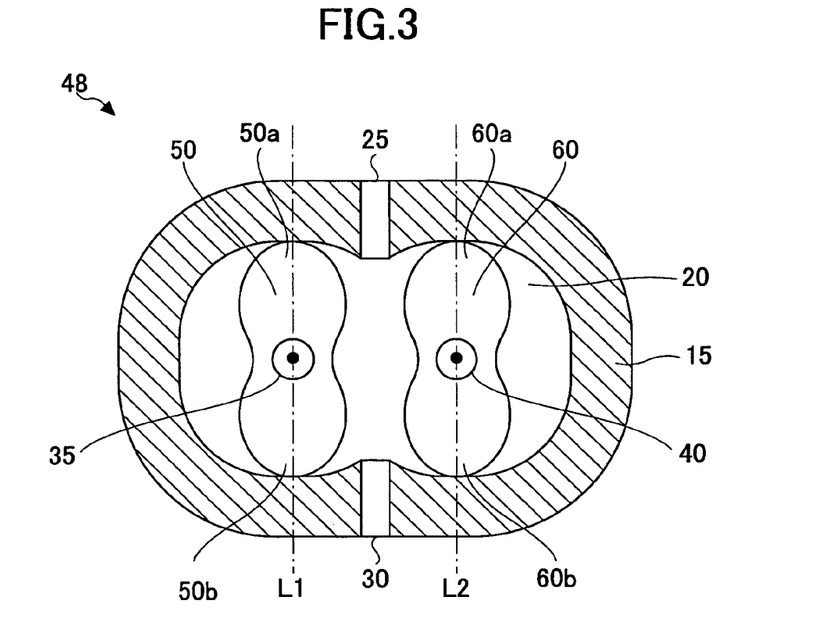
FIG. 3 is a diagram showing stop positions of rotors in the pump chamber at a time of stopping the pump.

For example, as shown in FIG. 3, when the pump 10 is stopped, the rotors 50 and 60 are stopped in a condition that the straight line passing through the leading edges of two blade parts 50a and 50b of the rotor 50 and the straight line passing through the leading edges of two blade parts 60a and 60b of the rotor 60 are substantially at right angles to the installation surface of the pump. Since the rotors 50 and 60 are stopped in such positional relationship in the pump chamber 20 and there is no accumulation part where the water is accumulated on the rotor surfaces, even if the moisture contained in the off gases is condensed under low temperature, the most of the condensed water falls from the rotor surfaces by gravity. In this case, the falling water is spread to a certain degree on the bottom of the inside surface of the pump casing 15 (that is, the surface area of the casing inside surface which gets wet by the water is increased to be larger than that of the casing inside surface at the position indicated the character A in FIG. 2). Therefore, the above-mentioned freezing which blocks the clearance between the rotors 50 and 60 and the opposing inside surface of the pump casing 15 does not easily arise, and it is possible to avoid the problem that the rotors 50 and 60 adhere to the inside surface of the pump casing 15.

However, when the positional relationship of the rotors 50 and 60 and the inside surface of the pump casing 15 is determined as mentioned above, there may be a case in which the amount of the moisture condensed at a time of stopping the pump exceeds the maximum permissible amount (which is determined by the product of the surface area which gets wet by the falling water on the inside surface of the pump casing 15, and the dimension of the clearance, namely, it is determined by the volume). In such a case, there is a possibility that the freezing cause the bottom ends of the rotor blades to adhere to the opposing inside surface of the pump casing 15.

Figure 4:
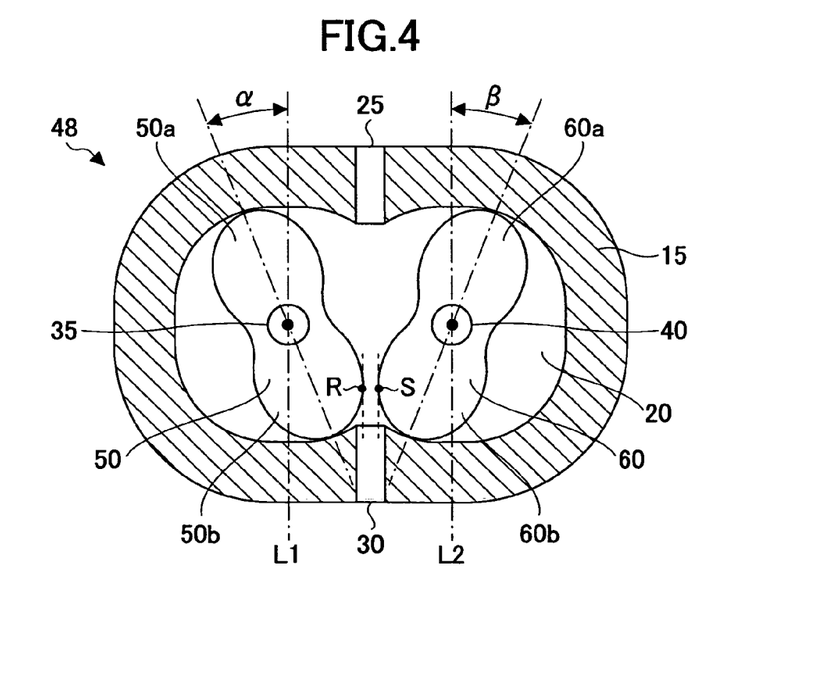
FIG. 4 is a diagram showing other stop positions of the rotors in the pump chamber at a time of stopping the pump.

Another embodiment of the pump 10 of the invention is arranged to eliminate the above problem as follows. As shown in FIG. 4, when the pump 10 is stopped, the rotors 50 and 60 are stopped at predetermined positions in the pump chamber 20 where the longitudinal directions of the rotors (the respective directions of the straight lines passing through the leading edges of the two blade parts of the rotors) are not parallel to the vertical direction and at predetermined inclination angles $\alpha$ and $\beta$ to the vertical direction, respectively.

The inclination angle $\alpha$ is determined appropriately such that a position on the outer circumference of the lower blade part 50b of the first rotor where the horizontal distance from the vertical line L1, passing through the center of rotation of the first rotor (or the point which the first revolving shaft passes through), to the center of the pump chamber, is the maximum is determined as a point R, and the straight line extending from the point R in parallel to the vertical direction passes through the discharge port 30.

Similarly, the inclination angle $\beta$ is determined appropriately such that a position on the outer circumference of the lower blade part 60b of the second rotor where the horizontal distance from the vertical line L2, passing through the center of rotation of the second rotor (or the point which the second revolving shaft passes through), to the center of the pump chamber, is the maximum is determined as a point S, and the straight line extending from the point S in parallel to the vertical direction passes through the discharge port 30.

In the pump 10 of this embodiment, the rotors are stopped at the above-mentioned positions when the pump 10 is stopped. Accordingly, even if the residual water condenses on the rotor surfaces in low temperature environment, the condensed water falls from the rotor surfaces by gravity and it is discharged from the discharge port 30. Therefore, it is possible to reduce further the possibility that the freezing arises on the inside surfaces of the rotors and the opposing casing.

In order to allow the rotors 50 and 60 to be stopped in the positional relationship as shown in FIG. 3 and FIG. 4, it is necessary to provide a switching mechanism 80 which separates the second timing gear 72, fixed to the second revolving shaft 40, from the first timing gear 70 when the pump 10 is stopped, and allows one of the rotors 50 and 60 to be stopped without being restrained by the position of the other of the rotors 50 and 60.

For example, the switching mechanism 80 can be easily formed by a combination of the known electromagnetic coupling (clutch) and permanent magnets. For example, at a time of stopping the pump, the electromagnetic coupling 74 (see FIG. 2) is controlled to make the second timing gear 72 slide and be separated from the first timing gear 70. At the same time, by using the permanent magnets (not shown) arranged at suitable positions outside the pump chamber, the blade parts of each rotor are stopped at the predetermined positions (for example, they are set in the vertical position).

At a time of restarting operation of the pump 10, the switching mechanism 80 including the electromagnetic coupling 74 is controlled again to make the second timing gear 72 slide in the direction that is opposite to the above-mentioned direction, so that the second timing gear 72 is engaged with the first timing gear 70, and the positional relationship of the first rotor 50 and the second rotor 60 is returned to the condition shown in FIG. 2. Namely, the rotors 50 and 60 are placed to have a phase difference of 90 degrees in the rotational angle between the rotor 50 and the rotor 60.

Next, the first revolving shaft 35 is rotated by the drive motor 45, and the first rotor 50 is rotated. At the same time, the rotating movement is transmitted to the second revolving shaft 40 via the timing gears 70 and 72, and the second rotor 60 is rotated by the rotation of the second revolving shaft 40 with the phase difference of 90 degrees to the first rotor 50 being retained.

Accordingly, the pump according to the invention is arranged so that the rotors are stopped in the position where the clearance between each rotor and the opposing casing inside surface is hardly influenced by the condensed water. Thus, even if the condensed water is frozen, the adhesion of the rotors does not easily take place, and it is possible to start the pump promptly even under low temperature environment.

The pump according to the invention can be used as either a fuel-gas pump or an oxidizing-agent-gas pump of a fuel cell system. A description will now be given of an embodiment of a fuel cell system which uses the pump according to the invention. In the following, an example of a fuel cell system in which the pump according to the invention is provided in a circulating passage of the fuel-off gas. However, the pump according to the invention is also applicable to a circulating passage of the oxidizing-agent-off gas.

Figure 5:
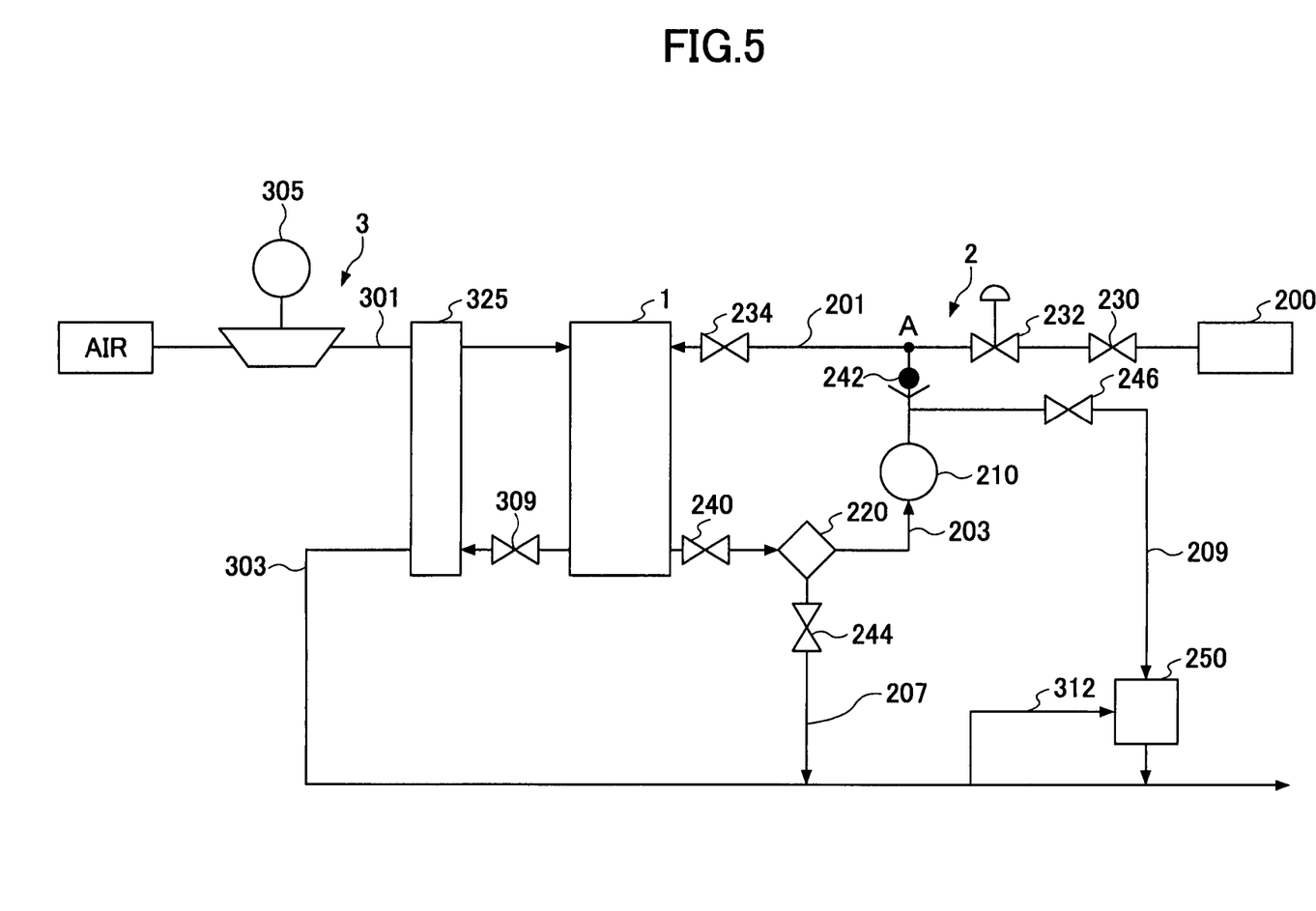
FIG. 5 is a diagram showing the composition of a fuel cell system in which the pump according to the invention is used as a hydrogen pump.

FIG. 5 shows the composition of a fuel cell system in which the pump according to the invention is provided as a hydrogen pump. This system has a fuel cell body 1, and electric power generated in the fuel cell body 1 may be used as a source of operation of an automotive vehicle, for example.

The fuel cell system includes a fuel-gas passage 2 for circulating a fuel gas within the fuel cell system, and an oxidizing agent gas passage 3 for circulating an oxidizing agent gas within the fuel cell system. In the following, an example of a fuel cell system which uses hydrogen gas as the fuel gas being supplied to the fuel cell will be described. However, the pump according to the invention is also applicable to a fuel cell system which uses a fuel gas other that hydrogen gas.

The fuel-gas passage 2 includes a fuel-gas feed passage 201 for supplying a fuel gas from a source of hydrogen fuel, such as a high-pressure hydrogen tank 200, to the fuel cell body 1, and a fuel-off gas discharge passage 203 for discharging a fuel-off gas from the fuel cell body 1.

The fuel-off gas discharge passage 203 is substantially a circulation passage, and this passage connects the fuel cell body 1 to the fuel-gas feed passage 201 via a gas/liquid separator 220 and a hydrogen pump 210 (which is the pump according to the invention). The fuel-off gas discharge passage 203 may be also called circulation passage 203. A first branch passage 207 and a second branch passage 209 are connected to the circulation passage 203.

A normally-closed solenoid valve 230 is arranged at a discharge port of the high-pressure hydrogen tank 200, and a pressure reduction control valve 232 and a normally-closed solenoid valve 234 are arranged in the fuel-gas feed passage 201 of the fuel-gas passage 2 at a position apart from the fuel cell body 1 and at a position near the fuel cell body 1, respectively.

On the other hand, in the circulation passage 203, a normally-closed pressure reduction control valve 240, a gas/liquid separator 220, a hydrogen pump 210, and a non-return valve 242 are arranged in this order at positions along the circulation passage 203 respectively that are arrayed apart from the fuel cell body 1.

The first branch passage 207 is connected to the gas/liquid separator 220 via a normally-closed solenoid valve 244. The second branch passage 209 is connected to the circulation passage 203 at an intermediate point between the discharge port of the hydrogen pump 210 and the junction point A of the circulation passage 203 and the fuel-gas feed passage 201.

A normally-closed solenoid valve (purge valve) 246 and a dilution device 250 are arranged in the second branch passage 209, and the other end of the second branch passage 209 at the discharge port of the dilution device 250 is connected to an oxidizing-agent-off gas discharge passage 303 which will be mentioned later. The other end of the first branch passage 207 is also connected to the oxidizing-agent-off gas discharge passage 303.

On the other hand, the oxidizing agent gas passage 3 contains an oxidizing agent gas feed passage 301 for supplying an oxidizing agent gas to the fuel cell body 1, and an oxidizing-agent-off gas discharge passage 303 for discharging an oxidizing-agent-off gas from the fuel cell body 1.

A compressor 305 and a humidifier 325 are arranged in the oxidizing agent gas feed passage 301. The humidifier 325 is arranged in the oxidizing-agent-off gas discharge passage 303, and a solenoid valve (air escape valve) 309 is arranged between the humidifier 325 and the fuel cell body 1.

The oxidizing-agent-off gas discharge passage 303 includes an oxidizing-agent-off gas branch passage 312 arranged at a downstream side position from the junction point of the oxidizing-agent-off gas discharge passage 303 and the branch passage 207, and this oxidizing-agent-off gas branch passage 312 is connected to the dilution device 250. Alternatively, the dilution device 250 and the oxidizing-agent-off gas branch passage 312 may be omitted from the fuel cell system.

Next, a description will be given of a normal flow of oxidizing agent gas. In a normal operation of the fuel cell system, the compressor 305 is driven so that the atmospheric air is captured as oxidizing agent gas, passes through the oxidizing agent gas feed passage 301, and is supplied to the fuel cell body 1 via the humidifier 325.

The supplied oxidizing agent gas is consumed by the electrochemical reaction in the fuel cell body 1, and then discharged from the fuel cell body 1 as oxidizing-agent-off gas. The discharged oxidizing-agent-off gas passes through the oxidizing-agent-off gas discharge passage 303, and it is discharged to the outside of the fuel cell system.

Next, a description will be given of a flow of hydrogen gas. In a normal operation of the fuel cell system, the solenoid valve 230 is opened so that hydrogen gas from the high-pressure hydrogen tank 200 is entered, and passes through the fuel-gas feed passage 201, and its pressure is then reduced by the pressure reduction control valve 232. Thereafter, the hydrogen gas is supplied to the fuel cell body 1 via the solenoid valve 234.

The supplied hydrogen gas is consumed by the electrochemical reaction in the fuel cell body 1, and it is then discharged from the fuel cell body 1 as hydrogen-off gas. After it passes through the circulation passage 203 and the moisture is removed by the gas/liquid separator 220, the discharged hydrogen-off gas is returned to the fuel-gas feed passage 201 via the hydrogen pump 210, and is again supplied to the fuel cell body 1.

Since the non-return valve 242 is arranged between the hydrogen pump 210 and the junction point A of the fuel-gas feed passage 201 and the circulation passage 203, the hydrogen-off gas which is circulated does not flow backwards.

Normally, the solenoid valves 244 and 246 in the first and second branch passages 207 and 209 are set in the closed state. If these valves are set in the opened state when needed, the moisture-containing gas processed by the gas/liquid separator 220 and the hydrogen-off gas that does not need circulation will be discharged from each branch passage. These liquids and/or gases are discharged out of the fuel cell system via the oxidizing-agent-off gas discharge passage 303.

When the above-described fuel cell system is stopped under low temperature environment, the hydrogen pump 210 has the above-described characteristics of the invention, so that freezing of the rotors does not easily arise due to the water condensed in the pump chamber even if the hydrogen-off gas is contained in the pump chamber. Accordingly, it is possible to start operation of the fuel cell system promptly at a next time of system restart.

The present invention is not limited to the specific structure of the fuel cell system as in the above-mentioned embodiment, which has been used for the purpose of illustration. It should be noted that, in the actual fuel cell system, other component parts, such as solenoid valves and piping, may be arranged at positions which are not shown in the above-mentioned embodiment, and, conversely, some component parts shown in FIG. 5 may be omitted in the actual fuel cell system.

The present application is based upon and claims the benefit of priority of Japanese patent application No. 2005-353150, filed on Dec. 7, 2005, the contents of which are incorporated by reference in their entirety.

The invention claimed is:

1. A Roots type pump in which two rotors are rotated synchronously in a pump chamber to compress fluid therein, wherein respective stop positions of the rotors in the pump chamber at a time of stopping the pump are determined independently of each rotor, and,
   wherein the first and second rotors are arranged in two-blade formation, and the first and second rotors are stopped at positions other than where a direction of a straight line passing through a leading edge of one of two blade parts of each rotor and a leading edge of the other of the two blade parts is at right angles to a vertical direction.

2. The Roots type pump according to claim 1, wherein the first and second rotors are stopped at the respective stop positions where a direction of a straight line passing through a leading edge of one of two blade parts of each rotor and a leading edge of the other of the two blade parts is in parallel to the vertical direction.

3. The Roots type pump according to claim 1, wherein a discharge port for discharging compressed fluid is arranged at a bottom portion of the pump chamber, wherein the first and second rotors are stopped at the respective stop positions where a straight line passing through a leading edge of one of two blade parts of the first rotor and a leading edge of the other of the two blade parts and a straight line passing through a leading edge of one of two blade parts of the second rotor and a leading edge of the other of the two blade parts of the second rotor are at inclination angles to the vertical direction respectively, and wherein the inclination angles are determined such that positions on outer circumferences of lower blade parts of the first and second rotors where a horizontal distance from a vertical line passing through a center of rotation of each rotor, to a center of the pump chamber is the maximum are determined as points R and S, respectively, and a straight line extending from the point R and a straight line extending from the point S both in parallel to the vertical direction pass through the discharge port.

4. The Roots type pump according to claim 3, wherein the first and second rotors are not in contact with each other at a time of stopping the pump.

5. A fuel cell system in which the Roots type pump according to claim 1 is provided.

6. A Roots type pump in which a first rotor fixed to a first revolving shaft and a second rotor fixed to a second revolving shaft are rotated synchronously in a pump chamber to compress fluid therein, comprising:
   a switching mechanism wherein, at a time of pump operation, rotation of the first rotor by the first revolving shaft and rotation of the second rotor by the second revolving shaft is set in a synchronous condition, and at a time of stopping the pump, rotation of the first rotor by the first revolving shaft and rotation of the second rotor by the second revolving shaft is set in an asynchronous condition,
   wherein the first and second rotors are arranged in two-blade formation, and the first and second rotors are stopped at positions other than where a direction of a straight line passing through a leading edge of one of two blade parts of each rotor and a leading edge of the other of the two blade parts is at right angles to a vertical direction.

7. A Roots type pump in which a first rotor fixed to a first revolving shaft and a second rotor fixed to a second revolving shaft are rotated synchronously in a pump chamber to compress fluid therein, comprising:
   a first gear attached to an end of the first revolving shaft which rotates the first rotor; and
   a second gear attached to an end of the second revolving shaft which rotates the second rotor,
   wherein, at a time of starting the pump, the first gear and the second gear are engaged with each other, and rotation of the first revolving shaft by an external drive source enables the second revolving shaft to be rotated via the engaged first and second gears so that the first and second rotors are rotated synchronously, and
   wherein the first and second rotors are arranged in two-blade formation, and, at a time of stopping the pump, the first gear and the second gear are disengaged and the first and second rotors are stopped at positions at positions other than where a direction of a straight line passing through a leading edge of one of two blade parts of each rotor and a leading edge of the other of the two blade parts is at right angles to a vertical direction.

8. The Roots type pump according to claim 7, wherein engagement and disengagement of the first gear and the second gear are performed by using an electromagnetic coupling, and the first and second rotors are stopped at the predetermined stop positions by using permanent magnets arranged outside the pump chamber.

* * * * *

UNITED STATES PATENT AND TRADEMARK OFFICE
CERTIFICATE OF CORRECTION

PATENT NO.           : 7,794,218 B2                                          Page 1 of 1
APPLICATION NO.      : 12/083769
DATED                : September 14, 2010
INVENTOR(S)          : Nobuo Fujita It is certified that error appears in the above-identified patent and that said Letters Patent is hereby corrected as shown below:

| Column | Line | |
|--------|------|--|
| 7  | 35 | Change "is used" to --is using--. |
| 8  | 13 | Change "indicated the" to --indicated by the--. |
| 12 | 21 | Change "pass" to --passing--. |
| 12 | 65 | Delete "at positions" (second occurrence). |

Signed and Sealed this
Twenty-eighth Day of December, 2010

David J. Kappos
*Director of the United States Patent and Trademark Office*